United States Patent [19]

Horwill

[11] Patent Number: 5,707,097
[45] Date of Patent: Jan. 13, 1998

[54] FASTENER ASSEMBLIES FOR VEHICLE ACCESSORIES

[76] Inventor: Rodney Edward Horwill, P.O. Box 171, Salisbury Queensland 4107, Australia

[21] Appl. No.: 552,109

[22] Filed: Nov. 2, 1995

[30] Foreign Application Priority Data

Nov. 3, 1994 [AU] Australia ................... PM9201
Jul. 19, 1995 [AU] Australia ................... PN4235

[51] Int. Cl.⁶ ......................................... B60J 1/20
[52] U.S. Cl. ........................ 296/91; 411/60; 411/182
[58] Field of Search ..................... 296/91; 411/182, 411/55, 60

[56] References Cited

U.S. PATENT DOCUMENTS

| 4,729,704 | 3/1988 | Yokoyama | 411/182 |
| 4,906,152 | 3/1990 | Kurihara | 411/182 |
| 5,098,765 | 3/1992 | Bien | 411/182 |
| 5,234,247 | 8/1993 | Pacer . | |
| 5,320,461 | 6/1994 | Stanesic . | |
| 5,348,363 | 9/1994 | Fink . | |

FOREIGN PATENT DOCUMENTS 1013219  12/1965  United Kingdom ............ 411/60

*Primary Examiner*—Gary C. Hoge
*Attorney, Agent, or Firm*—Shoemaker and Mattare, Ltd.

[57] ABSTRACT

A fastener assembly for fastening a vehicle hood shield to a vehicle hood, the hood shield having a mounting flange with spaced apart slots therein and the hood having spaced apart mounting apertures. The fastener assembly includes an insert or plug which has a head and legs depending from the head and receivable in the hood apertures. The insert or plug also has lugs for receipt in the hood shield slots. A screw fastener screwed into the insert or plug causes the legs to move outwardly and engage a hood mounting aperture and also serves to secure the hood shield to the insert or plug and thus the hood.

12 Claims, 4 Drawing Sheets

FASTENER ASSEMBLIES FOR VEHICLE ACCESSORIES

TECHNICAL FIELD

This invention relates to improved fastener assemblies which have particular but not exclusive application to securing vehicle hood protectors or shields or other vehicle accessories such as headlight covers to vehicles.

BACKGROUND ART

Fastening arrangements of a number of different forms are used for securing hood protectors or other vehicle accessories to vehicles. In a simplified form, self tapping screws are employed which secure the protector or accessory directly to the vehicle body. Such arrangements do not allow easy detachment of the protectors or accessory and can damage the vehicle body. In other instances, spring clips may be used to hold the protector or accessory in position, however, these sometimes have proven not to be particularly secure. Whilst inserts for attachment to the vehicle body having threaded apertures to receive screw fasteners passed through the protector or accessory are known, they are usually designed to fit only one size mounting aperture on the body.

If a fixing system is to be provided to suit a number of different vehicles having different sized mounting apertures, a number of different sized inserts are required to be provided. This obviously is not only inconvenient but adds to coat, particularly where a number of different moulds are required for the plastic moulding of the inserts. Other fastening systems use adhesive pads. Expandable plugs are known in other applications, such as in wall board applications, where a particular mounting is required to a wall. Such plugs are not suitable for use in mounting through an aperture in thin materials such as encountered in vehicle accessory mounting applications. U.S. Pat. Nos. 523427, 532046 and 5348363 illustrate typical fastening arrangements currently known or used in the above applications, however, each has disadvantages.

SUMMARY OF THE INVENTION

The present invention aims to provide an improved fastener assembly including an insert for location within a preformed aperture in a vehicle body and which may accept a screw or threaded fastener to enable mounting of a vehicle accessory, such as a vehicle hood protector to the vehicle in a reliable and efficient manner. The present invention also aims in a further preferred aspect to provide a fastener assembly including an insert which may adapt to apertures of a range of sizes. Other objects and advantages of the invention wall become apparent from the following description.

The present invention thus provides in a first aspect a fastener assembly for securing a hood protector or shield to a hood of a vehicle, said hood having a mounting aperture, and said hood protector or shield having a main body portion and a mounting flange extending from said main body portion, said mounting flange having an opening therein, said fastener assembly including an insert having a portion receivable in said mounting aperture of said hood, and lug means receivable in said opening in said mounting flange for preventing rotation of said insert relative to said shield or protector, and means for expanding said insert portion into engagement with said aperture to secure said protector or shield to said hood.

The insert portions suitably comprise legs which may include shoulders intermediate their ends which is adapted to locate on the side of the aperture opposite to the head portion. An opening is formed centrally in the head portion to receive the expanding means which may comprises a fastener, preferably a threaded fastener which causes radially outward movement of the leg portions.

The threaded fastener preferably is a screw of the self cutting thread type, including a substantially conical or tapering shank portion such that when inserted and screwed into the screw receiving opening, it causes the legs of the insert to move apart and increase the dimensions of the insert widthwise so that the legs firmly engage with the aperture in the hood.

The lug means may include one or more lugs and the aperture in the hood protector or shield may comprised a slot for receipt of the lugs to prevent rotation of the insert upon insertion and rotation of the screw fastener. The lugs are preferably of a height less than the thickness of the first member. Two lugs may be provided, arranged diametrically opposite to each other relative to the opening which is adapted to receive the threaded fastener.

The leg portions may be formed relatively rigidly with the head portion or alternatively, the leg portions may be arranged for movement towards and away from each other. In this latter aspect, the insert may include two opposed substantially identical ports, each of which includes a leg. Means interconnect the first and second parts of the insert and suitably comprise resilient elements which permit the parts to move to a limited degree towards and away from each other. The elements may be disposed at opposite sides of the insert and in a preferred form, are of a curved, half annular or ring configuration. The elements preferably are formed integrally with the opposite insert parts. The elements are thus of a resilient nature.

In a further aspect, the present invention provides in combination, a vehicle including a hood and a hood shield for said hood, said hood and hood shield having respective mounting apertures, and a fastener assembly for securing said hood shield to said hood, said fastener assembly including an insert having a head, and first and second portions on opposite sides of said head and adapted to be received in the respective said mounting apertures of said hood and hood shield, and means for expanding one of said portions into engagement with one of said apertures for securing said hood shield to said hood.

The present invention in yet a further aspect provides a method for attaching a hood shield to the hood of a vehicle, said hood and hood shield having mounting apertures, said method including providing fastener means for securing said shield to said hood, said fastener means comprising an insert having a first portion receivable in one of said mounting apertures and a second portion receivable in the other of said mounting apertures, and expanding one of said portions into engagement with its associated mounting aperture to secure said hood shield to said hood.

Whilst the invention has been described above in connection with a vehicle hood and hood shield or protector it may also be applied to securing other similar vehicle accessories such as headlight protectors, dust protectors or weathershields to a vehicle body. The invention may also be equally applied to securing other non vehicle related thin sheet-like parts together.

In yet a further aspect, the present invention provides an expandable insert, said insert having first and second opposing parts, each said part having a head portion and a leg portion depending from said leg portion, and resilient means interconnecting said parts for permitting said parts to move away from each other for expanding said insert.

In yet a further aspect, the present invention provides a fastener assembly for securing a vehicle accessory formed of thin plastics material to a vehicle, said vehicle having a mounting aperture, and said accessory having an opening therein, said fastener assembly including a plug having a portion receivable in said mounting aperture of said vehicle, and lug means receivable in said opening in said accessory for preventing rotation of said plug relative to said accessory, and means for expanding said plug portion into engagement with said aperture to secure said accessory to said vehicle.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENTS

Figure 1:
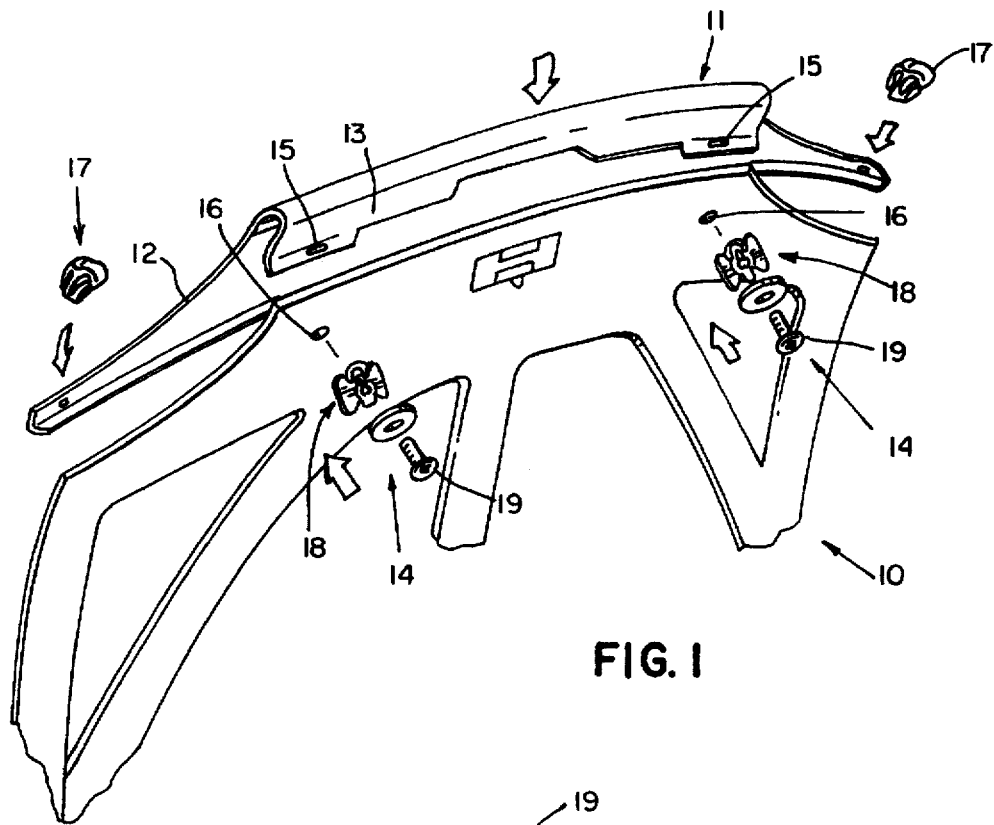
FIG. 1 illustrates a typical application of a fastener assembly according to an embodiment of the invention.
Figure 2:
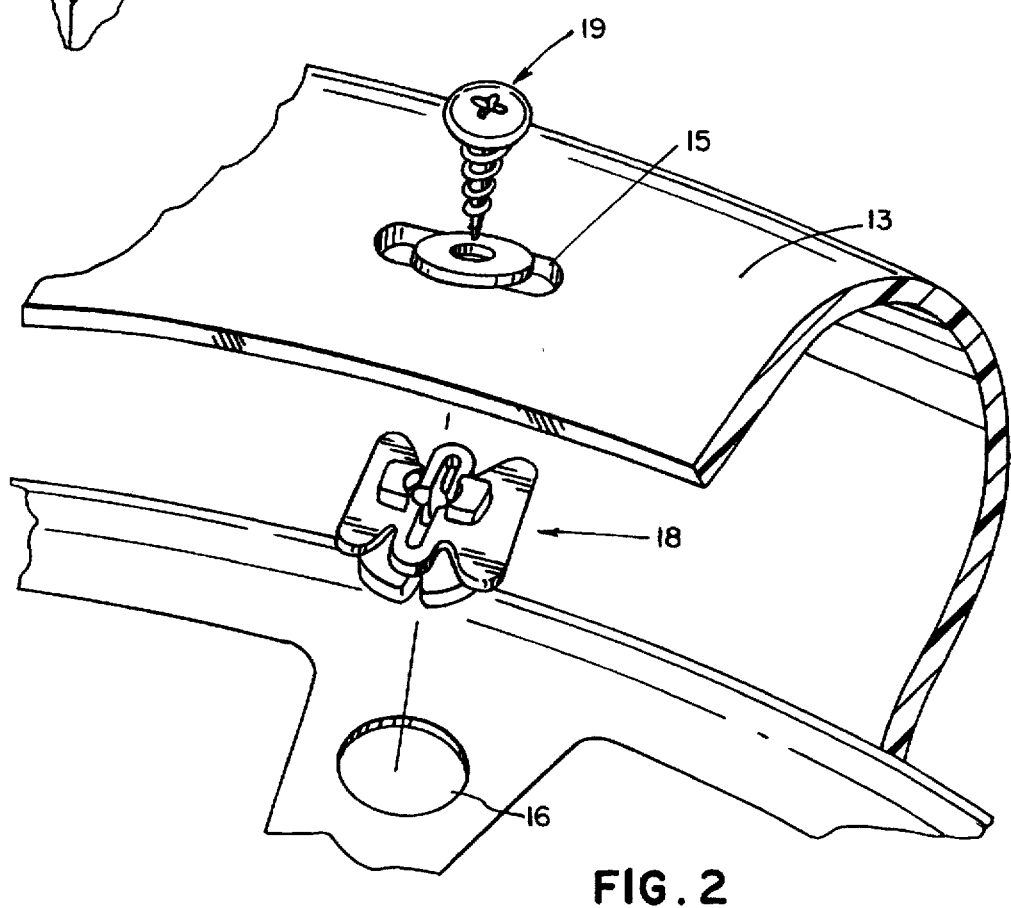
FIG. 2 is an exploded view showing the manner of use of the fastener assembly of FIG. 1.
Figure 3:
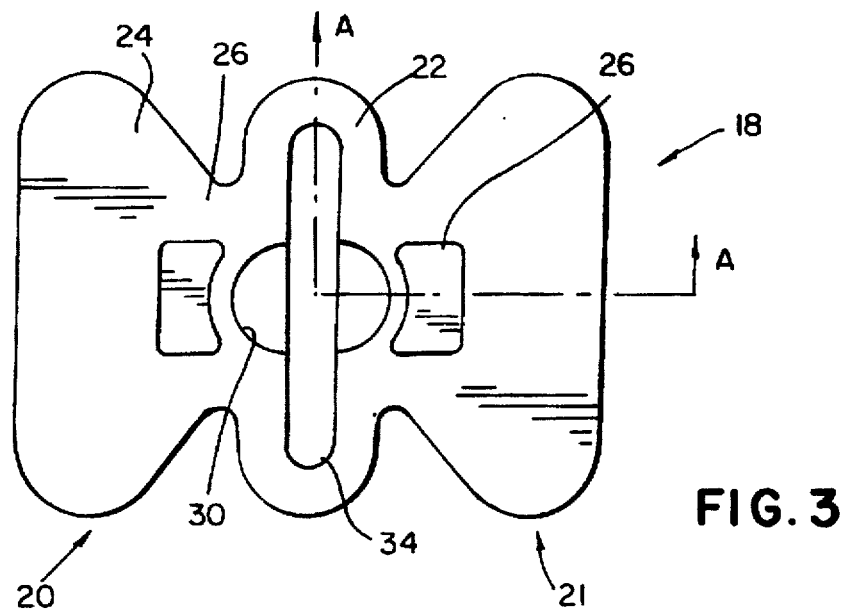
FIG. 3 is a top view of the insert of the fastener assembly of FIG. 1.
Figure 4:
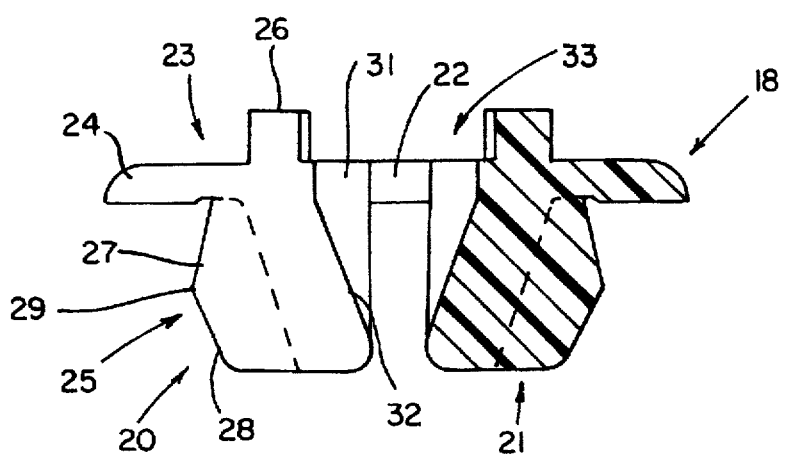
FIG. 4 is a sectional view along line A—A of FIG. 3.
Figure 5:
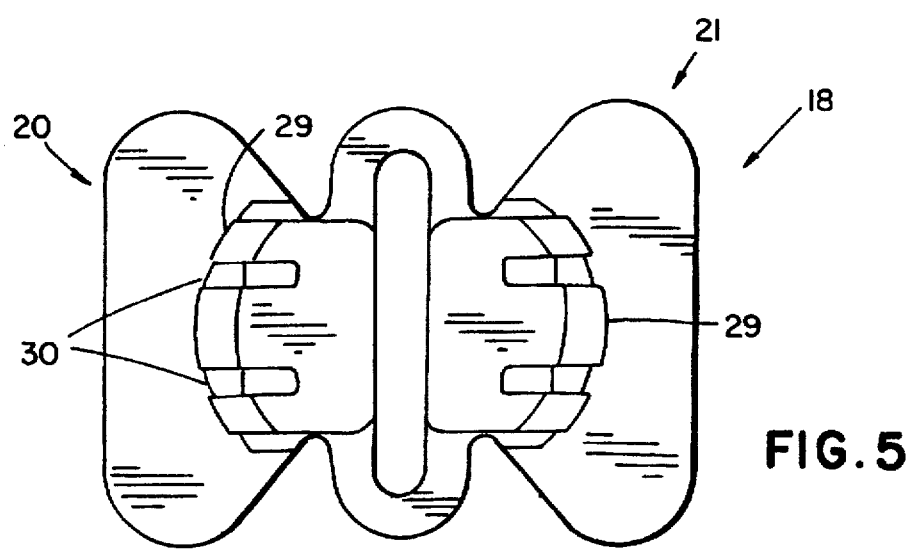
FIG. 5 is an underside view of the insert of FIG 3.
Figure 6:
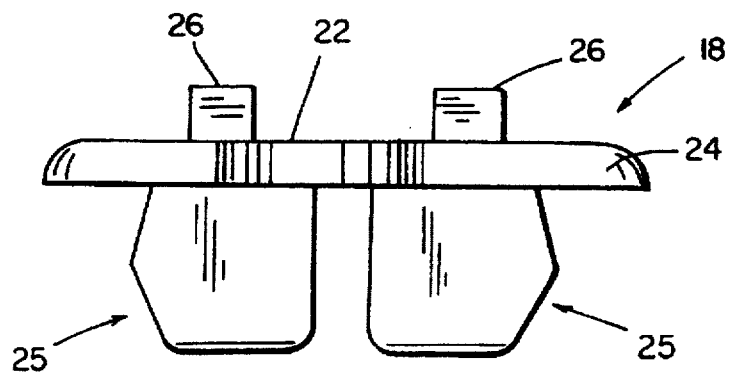
FIG. 6 is a side elevational view of the insert.

Referring to the drawings and firstly to FIG. 1, there is illustrated the underside of the leading end of a vehicle hood 10 to which is to be mounted a hood protector, shield or deflector 11 of conventional form, the protector 11 normally being constructed of a thin plastics material such as an acrylic which is moulded to a desired shape. The hood protector 11 in this embodiment has a main body portion 12 normally located on the upper side, and at the leading end, of the hood 10 and a return flange 13 which is located on the underside of the hood 10. The return flange is fixed to the underside of the hood 10 by means of spaced fastener assemblies 14 according to the invention. For this purpose, the flange 13 is provided with spaced apart slots 15 and the hood 10 is provided on its underside with spaced apart circular apertures 16, the apertures 16 being formed in a region of the hood 10 where the surrounding metal is relatively thin. The apertures 16 are usually preformed in the hood 10 but may be drilled in the hood 10 if required. The opposite ends of the protector 11 may also be secured to the hood 10 for added security by spring clips 17 which do not form part of the present invention.

Each fastener assembly 14, as more clearly shown in FIGS. 2 to 8 comprises an insert 18 formed of resilient plastics material such as nylon, adapted to be received within an aperture 16 in the hood 10, the insert 18, being arranged to receive a threaded fastener 19 which in this embodiment is adapted to secure the hood protector 11 to the vehicle hood 10 via the insert 18.

The insert 18, as shown more clearly in FIG. 3 to 6 includes first and second identical but opposed parts 20 and 21 which are interconnected on opposite sides by integrally formed part annular elements or arms 22 which permit a limited degree of movement of the insert parts 20 and 21 towards and away from each other. The elements 22 being formed of resilient material in effect act in the nature of leaf springs. Each insert part 20 and 21 includes a head 23 comprising a planar flange 24 and a depending leg 25. Extending upwardly from the flange 24 of each part 20 and 21 is a lug 26, the purpose of which will hereinafter become apparent. The depending leg 25 has a first upper outwardly and downwardly inclined part conical surface 27 and a second lower, downwardly and inwardly inclined part conical surface 28, the junction between the surfaces 27 and 28 defining a curved shoulder 29. The legs 25 may also be provided with outer axially extending grooves 30 which serve to assist in gripping the hole into which the insert 18 is inserted.

Each part 20 and 21 also includes a part circular recess 31 which tapers at its lower end at 32 into a part conical form. The recesses 31 oppose each other to define an opening 33 for receipt of the shank of the screw fastener 19. The parts 20 and 21 are separated by an elongated slot 34 defined by the elements 22.

Figure 7:
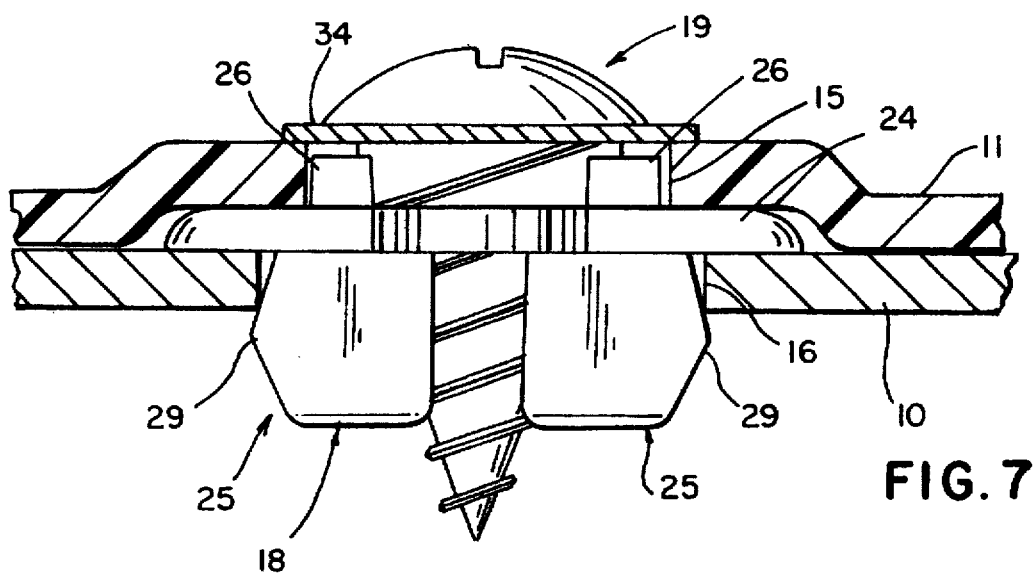
FIG. 7 illustrates in part sectional view the assembly of insert, hood protector and vehicle hood.
Figure 8:
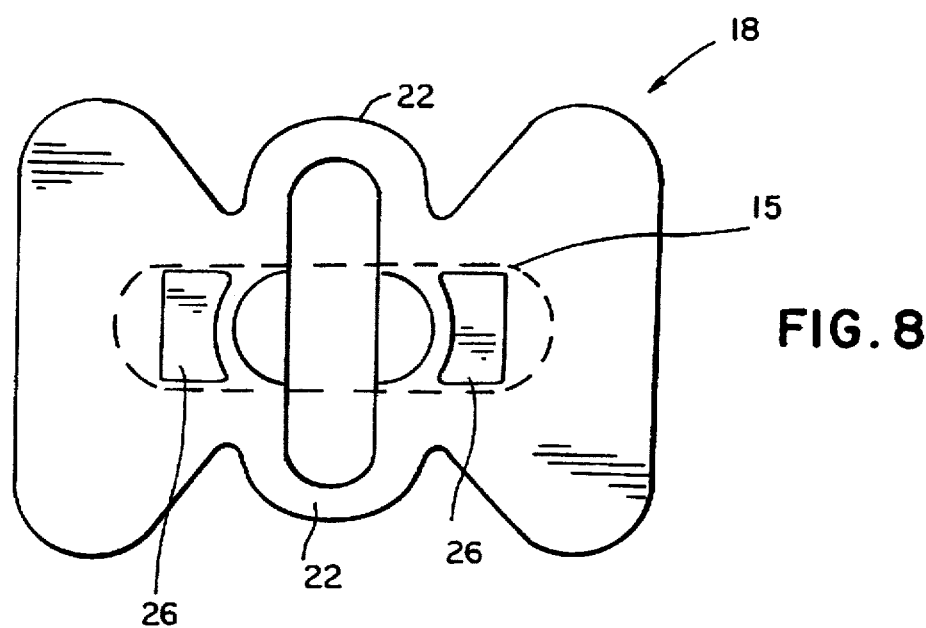
FIG. 8 is a plan view of the insert when expanded.
Figure 10:
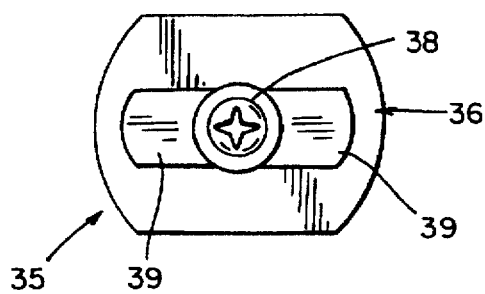
FIGS. 10 and 11 illustrate the insert of FIG. 9 in plan and elevational view.
Figure 9:
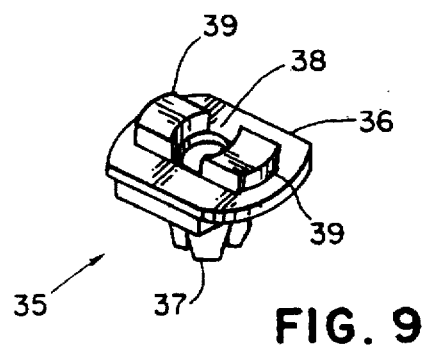
FIG. 9 illustrates in perspective view a further form of insert according to the present invention.
Figure 11:
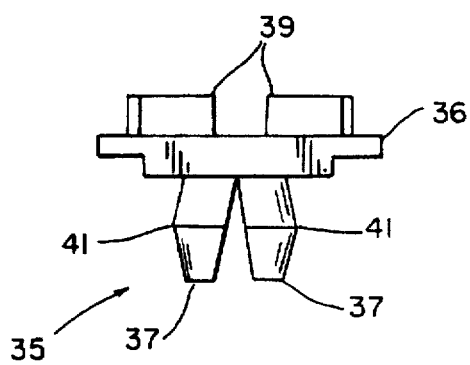

In use, the inserts 18 are located in the apertures 16 in the hood 10 of the vehicle. For this purpose the legs 25 are inserted into the aperture 16 and if the aperture 16 has a diameter smaller than the radial distance between the shoulders 29, an axial force is applied to the insert 18 which will cause the legs 25, through the inclined configuration of the leading leg surfaces 28 to be forced inwardly towards each other to reduce the radial distance between the shoulders 29 to enable the legs 25 to pass fully into the aperture 16 until the flange 24 of the head 23 of the insert 18 seats on or adjacent to the portion of the hood 10 surrounding the aperture 16 as shown in FIG. 7. The insert 18, thus effectively snaps into position as the legs 25 are allowed to move outwardly after the shoulders 29 pass through the aperture 16. Inward and outward movement of the parts 20 and 21 of the insert 18 towards and away from each other is facilitated by the resilient nature of the connecting elements 22.

The hood protector 11 may then be positioned by locating each slot 15 over the upstanding lugs 26 of each insert 18, the lugs 26 being of a width slightly less than the width of the slot 15. In this position, the head flange 24 is interposed between the hood shield 11 and hood 10, the hood shield 11 being of a slightly raised configuration in this region. Thereafter, the screw 19 may be inserted through the slot 15 and into the opening 33 defined between the opposing recesses 31 and screwed into the insert 18. The cooperation between the tapering shank of the screw 19, as well as the tapering portions 32 of the recesses 31 will cause the parts 20 and 21 to move radially outwardly as for example shown in FIG. 8 and thus cause the surfaces 27 of the legs 25 to firmly engage the wall of the aperture 16. When the screw 19 is fully tightened, the protector 11 is thus held securely to the insert 18 and the insert 18 is firmly secured in the aperture 16. During screwing in of the screw 19, the insert 18 is prevented from rotating through location of the lugs 26 in the slot 15 of the protector 11. The protector 11 however, may be simply removed by unscrewing the screws 19.

As shown in FIG. 7, the lugs 26 have a height which is less than the thickness of the material forming the hood protector 11. In addition, a washer 34, preferably a soft washer is interposed between the head of the screw 19 and the hood protector 11, such that when tightened firmly, damage to the material of the hood protector 11 is prevented. The hood protector 11, however, is firmly retained to the hood.

In most instances, and as shown in FIG. 1 at least two inserts 18 are provided at spaced locations for holding the protector 11 in position. The insert 18 and associated fastener 19, however, may be used as a single fastening unit in other applications.

The insert 18 is capable of use with a range of aperture sizes as it may simply snap into position and be finally be secured in position after insertion of the screw 19 and screwing in the screw which will cause radial outward movement of the insert parts 20 and 21. A range of screws of different sizes may be provided to suit different sized apertures 16, if for example increased movement of the parts 20 and 21 away from each other is required. The screw threads of the screw 19, however, are preferably self cutting, such that a screw of one size can be used where different sized apertures are encountered with variations in sizes being allowed through cutting of the thread into the insert 18.

The lugs 25 in addition to preventing rotation of the insert 18 through co-operation with the slot 16, also reduce the risk of the threads on the fastener 19 damaging the protector 11.

It wall be appreciated that the insert 18 may be of varying designs to achieve the object described. The legs 25 may be of different configurations, as may be the head portions of the insert parts 20 and 21. The insert 18 is typically formed integrally of a nylon material which will provide for the required degree of flex in the elements 22, however, other materials may be used for constructing the insert 18.

Referring now to FIGS. 9 to 13, there is illustrated a further form of insert 35 according to the present invention, including a head portion 36 in the form of a flat flange, a plurality of legs 37, in this instance four, extending to one side of the head portion 36 and arranged about a central opening 38 through the head portion 36. A pair of lugs 39 are upstanding from the opposite side of the head portion 36 and located on opposite sides of the opening 38, the lugs 39 being of similar form to the lugs 25 of the insert 18 of FIG. 2. In this instance, the legs 37 are relatively rigidly formed with the head portion 36 and are capable of deflecting outwardly when a screw 40 is screwed into the opening 38. The legs 37, however, also are formed so as to have their external surfaces flaring outwardly from the head portion 36 to an intermediate shoulder 41 and then converging inwardly towards the free ends of the legs 37.

Figure 12:
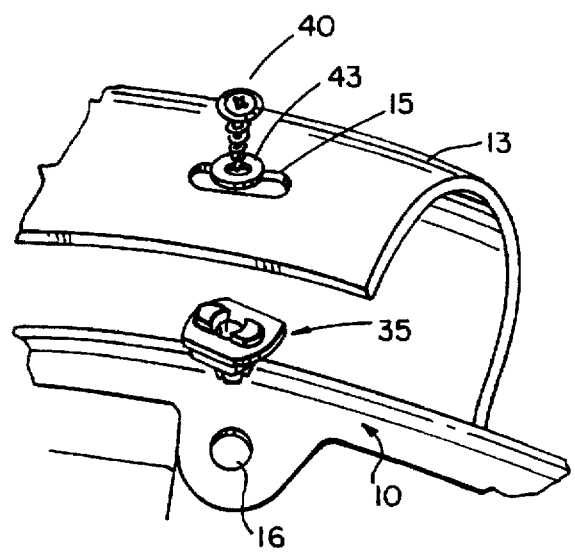
FIG. 12 is an exploded view showing the manner of use of the insert of FIG. 9.
Figure 13:
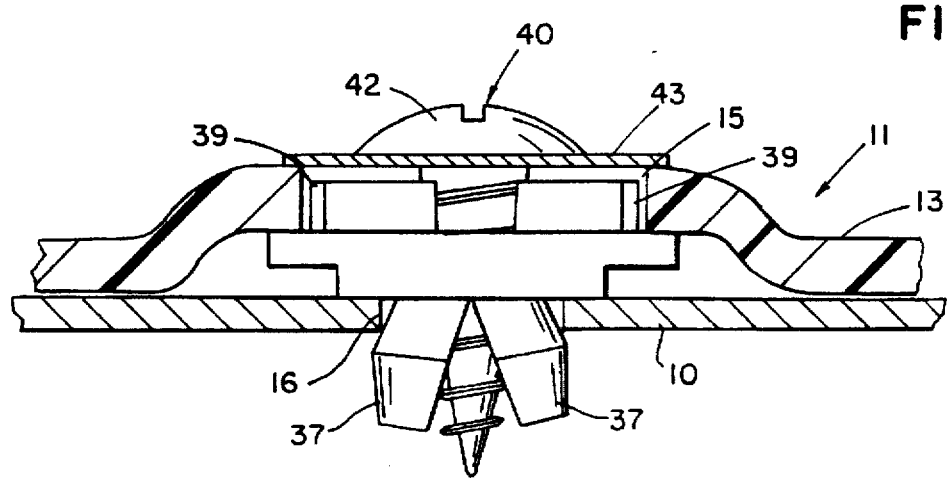
FIG. 13 illustrates in part sectional view the connection between the vehicle accessory and vehicle body, using the insert of FIGS. 9 to 11.

The insert 35 is used in a similar manner to that described with reference to the embodiment of FIGS. 1 to 8 and as shown in FIGS. 12 and 13. The insert 35 is initially pushed into a circular opening 16 in the vehicle hood 10, the opening 16 usually being of a diameter slightly less than the radial distance between the shoulders 41. When the legs 37 are forced into the opening, the legs 37 are initially deflected inwardly towards each other to reduce their radial dimensions and after the shoulders 41 pass through the aperture 16, the legs 37 due to their resilient nature move outwardly, thus snapping the insert 35 into position and retaining the insert 35 loosely in the aperture 16. The hood protector 11 is then positioned, such that a slot 15 therein receives the lugs 39. Insertion of the screw 40 and tightening thereof will cause the legs 37 to be forced outwardly as shown in FIG. 13 and urged into firm engagement with the wall of the aperture 16 so as to be retained to the vehicle hood 10. The fastener 19, passing through the slot 15, also secures the protector 11 to the hood 10 in the manner illustrated due to the head of the screw 40 having a radial dimension greater than the width of the slot 15. As before, the lugs 39 are of a height which is less than the thickness of the protector 11 and a washer 43 may be interposed between the screw head 42 and upper surface of the protector 11, the washer 43 suitably comprising a "soft" washer so as not to damage the protector 11.

Whilst the insert 35 is primarily designed for use in securing a vehicle bonnet or hood protector to a vehicle hood, it may be used in securing other vehicle accessories to the vehicle body.

Whilst the above has been given by way of illustrative embodiment of the invention, all such modifications and variations thereto as would be apparent to persons skilled in the art are deemed to fall within the broad scope and ambit of the invention as herein defined in the appended claims.

I claim:

1. A fastener assembly for securing a hood protector or shield to a hood of a vehicle, said hood having a mounting aperture, and said hood protector or shield having a main body portion and a mounting flange extending from said main body portion, said mounting flange having an opening therein, said fastener assembly including an insert having a portion receivable in said mounting aperture of said hood, and lug means receivable in said flange opening for preventing rotation of said insert relative to said shield or protector, and means for expanding said insert portion into engagement with said aperture to secure said protector or shield to said hood.

2. A fastener assembly according to claim 1 wherein said expanding means comprises fastener means, said fastener means securing said hood protector or shield to said insert.

3. A fastener assembly according to claim 2 wherein said insert includes a head portion and a central opening in said head portion for receipt of said fastener means for expanding said insert portion.

4. A fastener assembly according to claim 3 wherein said insert portion comprises a plurality of legs extending from said head portion, said legs being located about said central opening and being adapted to be urged apart by said fastener means.

5. A fastener assembly according to claim 4 wherein said insert portion has opposed legs interconnected by a resilient portion permitting said opposed legs to be urged apart from each other.

6. A fastener assembly according to claim 1 wherein said legs have outer surfaces which converge to define shoulders intermediate the ends of said legs.

7. A fastener assembly according to claim 5 wherein said resilient portion forms part of said head portion.

8. A fastener assembly according to claim 7 wherein said resilient portion comprises spaced apart curved members.

9. A fastener assembly according to claim 7 wherein said flange opening comprises a slot and wherein said lug means comprises lugs on opposite sides of said central opening for location in said slot.

10. A fastener assembly according to claim 9 wherein said fastener means comprises a threaded fastener.

11. A fastener assembly according to claim 10 wherein in use said lugs locate the fastener spaced from the periphery of the flange opening for preventing the fastener from damaging said periphery.

12. A fastener assembly for securing a vehicle accessory formed of thin plastics material to a vehicle, said vehicle having a mounting aperture, and said accessory having an opening therein, said fastener assembly including a plug having a portion receivable in said mounting aperture of said vehicle, and lug means receivable in said opening in said accessory for preventing rotation of said plug relative to said accessory, and means for expanding said plug portion into engagement with said aperture to secure said accessory to said vehicle.

* * * * *